(12) United States Patent
Burns, Jr.

(10) Patent No.: US 8,650,700 B1
(45) Date of Patent: Feb. 18, 2014

(54) LEAF BLOWER WHEEL ATTACHMENT

(76) Inventor: Frank J. Burns, Jr., Succasunna, NJ (US)

( * ) Notice: Subject to any disclaimer, the term of this patent is extended or adjusted under 35 U.S.C. 154(b) by 380 days.

(21) Appl. No.: 13/029,777

(22) Filed: Feb. 17, 2011

(51) Int. Cl.
*A47L 5/04* (2006.01)

(52) U.S. Cl.
USPC .......................................... 15/246; 15/246.2

(58) Field of Classification Search
USPC ................ 15/329, 327.5, 246, 405, 344, 328; 417/234
See application file for complete search history.

(56) References Cited

U.S. PATENT DOCUMENTS

| 5,884,462 | A | | 3/1999 | Gerber |
| 6,009,595 | A | * | 1/2000 | Leasure et al. .................. 15/329 |
| 6,050,069 | A | | 4/2000 | Elensky |
| 6,185,917 | B1 | | 2/2001 | Goudes |
| 6,226,833 | B1 | | 5/2001 | Kawaguchi et al. |

\* cited by examiner

*Primary Examiner* — Robert Scruggs

(57) ABSTRACT

A leaf blower wheel attachment that is connected to a canister suction attachment that is part of a typical leaf blower. The bottom end of the canister suction attachment is placed into each of two U-shaped attachment members. A pair of wheels are utilized, with each wheel being associated with one of the U-shaped attachment members. Each wheel has an associated wheel axle centrally disposed though a horizontal axis thereof, with each wheel axle operationally engaging the outer wall of each elongated U-shaped attachment members to secure the associated wheel to the canister. The canister suction attachment can then be dragged across a ground surface while in use instead of being carried.

2 Claims, 5 Drawing Sheets

LEAF BLOWER WHEEL ATTACHMENT

BACKGROUND OF THE INVENTION

Various types of leaf blower wheel attachments are known in the prior art. However, what is needed is a leaf blower wheel attachment that allows an individual to both intake a volume of leaves and have the leaf blower unit itself be easily mobile.

FIELD OF THE INVENTION

The present invention relates to a leaf blower wheel attachment, and more particularly, to a leaf blower wheel attachment that provides features and characteristics above and beyond existing leaf blowers presently in use.

SUMMARY OF THE INVENTION

The general purpose of the present leaf blower wheel attachment, described subsequently in greater detail, is to provide a leaf blower wheel attachment which has many novel features that result in a leaf blower wheel attachment which is not anticipated, rendered obvious, suggested, or even implied by prior art, either alone or in combination thereof.

To accomplish this, the leaf blower wheel attachment includes a leaf blower unit that includes a canister suction attachment that is part of a typical leaf blower. The bottom end of the canister suction attachment is placed into each of two U-shaped attachment members. A pair of wheels are utilized, with each wheel being associated with one of the U-shaped attachment members. Each wheel has an associated wheel axle centrally disposed though a horizontal axis thereof, with each wheel axle operationally engaging the outer wall of each elongated U-shaped attachment members to secure the associated wheel to the canister.

The present leaf blower wheel attachment alleviates a user's stress, fatigue, and pain typically suffered by a person using a leaf blower.

Thus has been broadly outlined the more important features of the present leaf blower wheel attachment so that the detailed description thereof that follows may be better understood and in order that the present contribution to the art may be better appreciated.

DETAILED DESCRIPTION OF THE DRAWINGS

Figure 1:
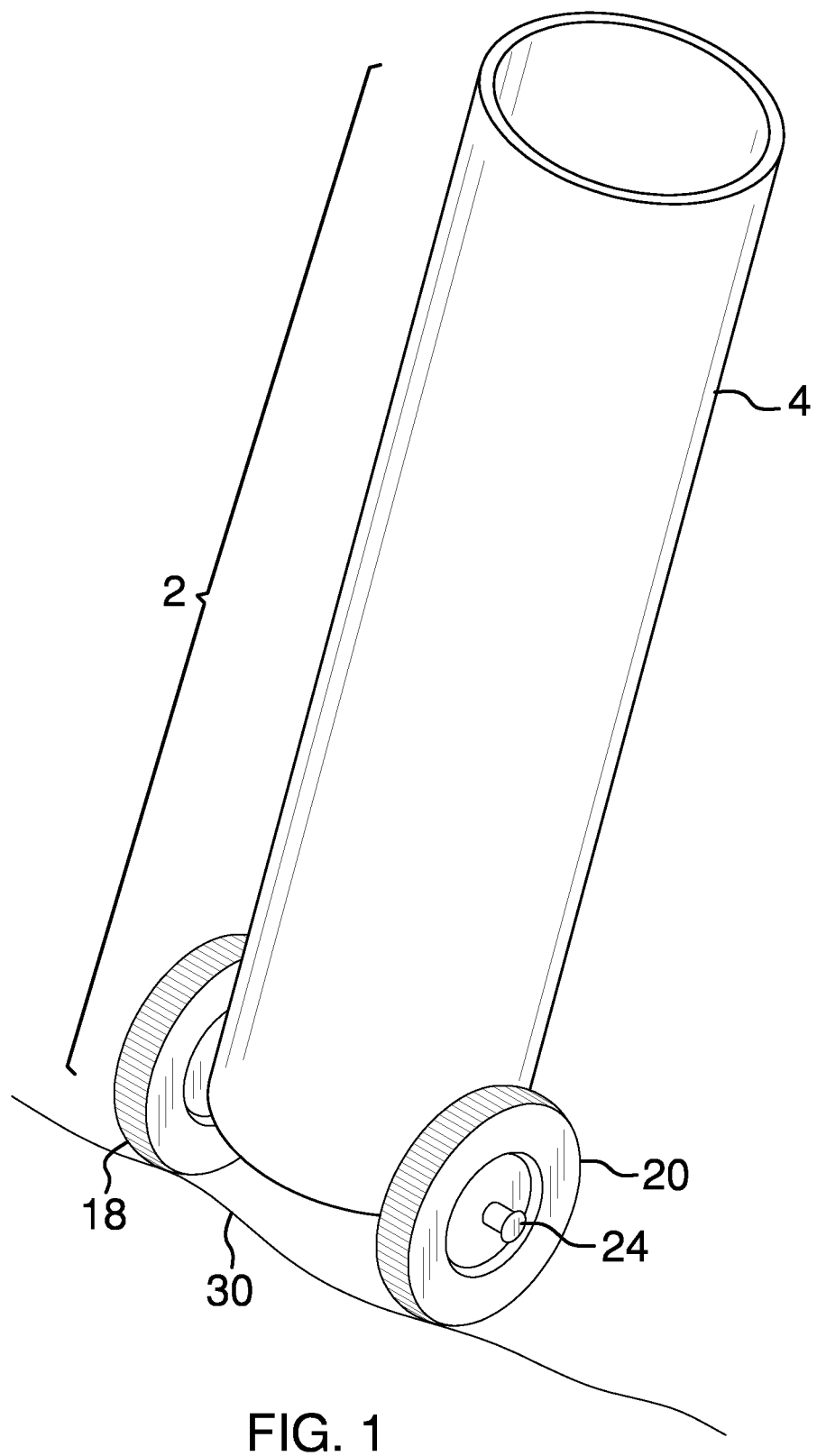
FIG. 1 is a front perspective view of the leaf blower wheel attachment as it is shown attached to portions of a leaf blower unit as it would appear in use.
Figure 2:
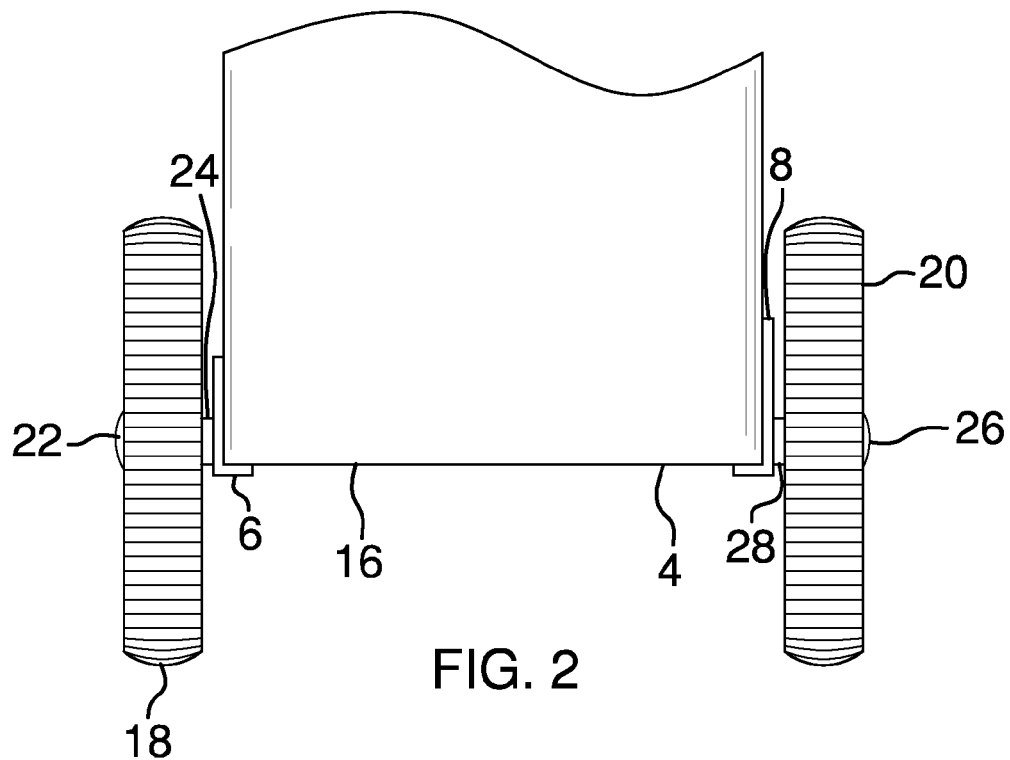
FIG. 2 is a front view of the leaf blower wheel attachment as it is shown in use.
Figure 3:
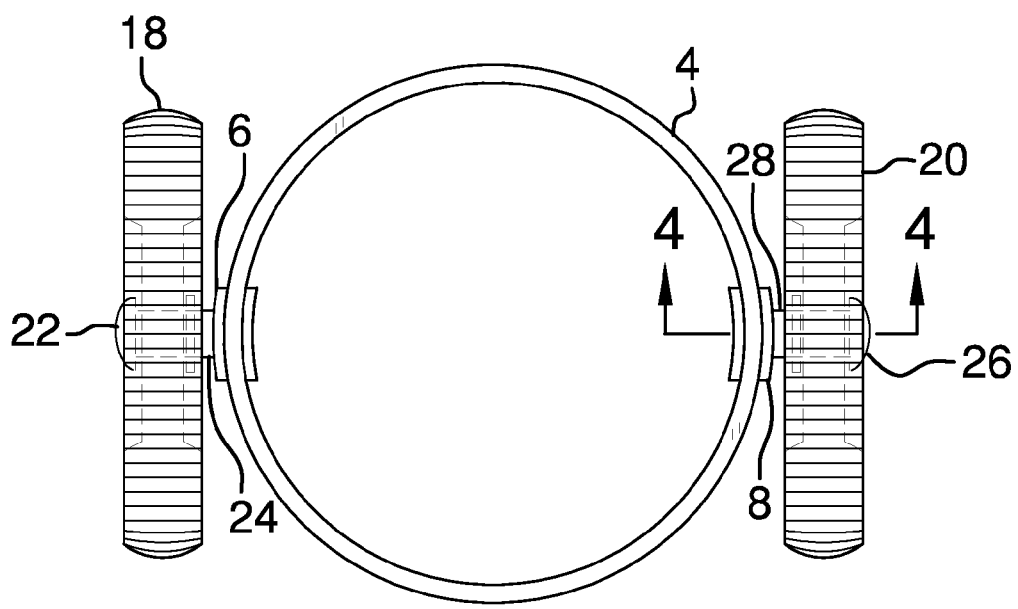
FIG. 3 is a bottom view of the leaf blower wheel attachment as it is shown in use.
Figure 4:
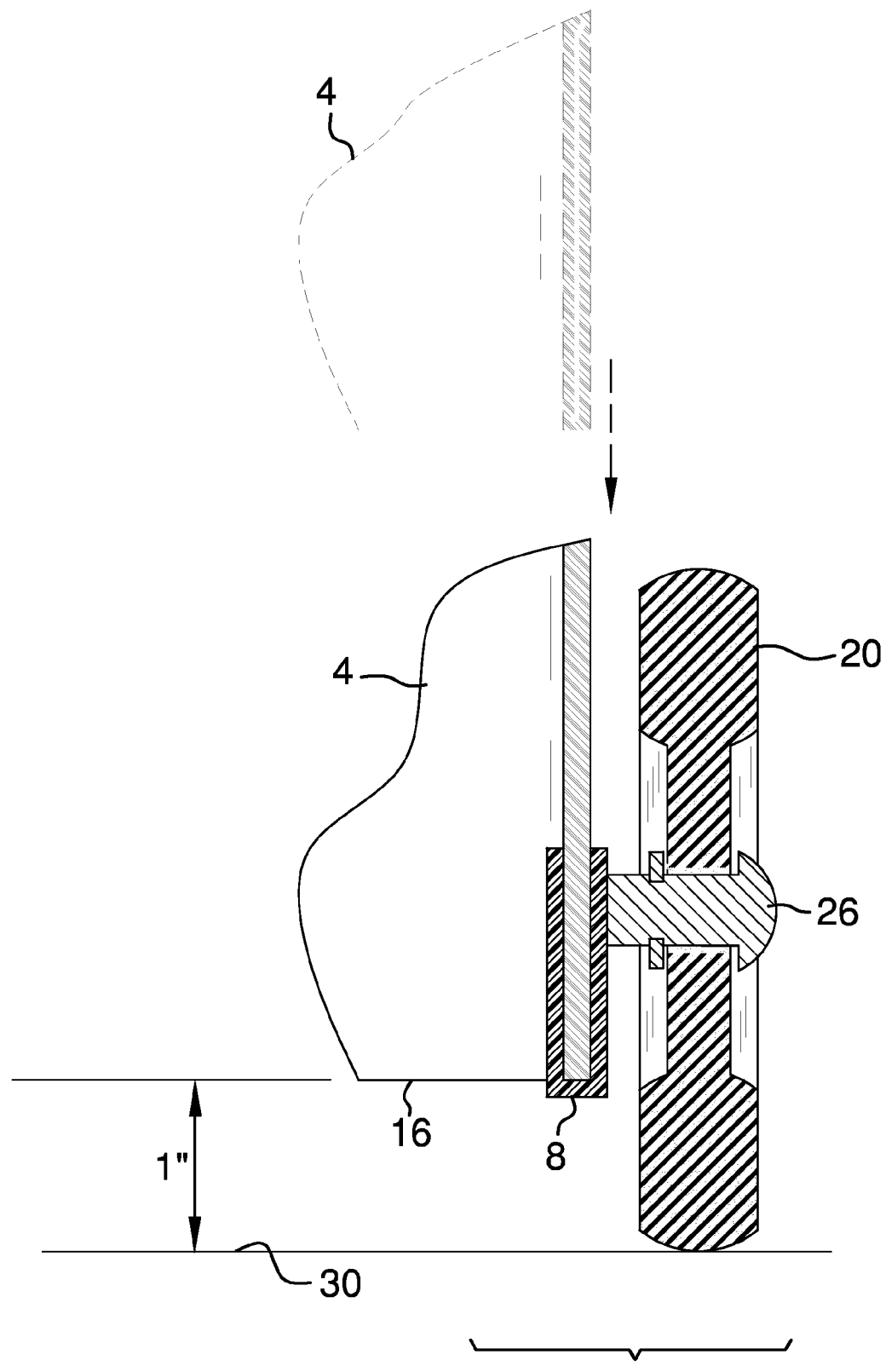
FIG. 4 is a side view of the leaf blower wheel attachment as it is shown being assembled.
Figure 5:
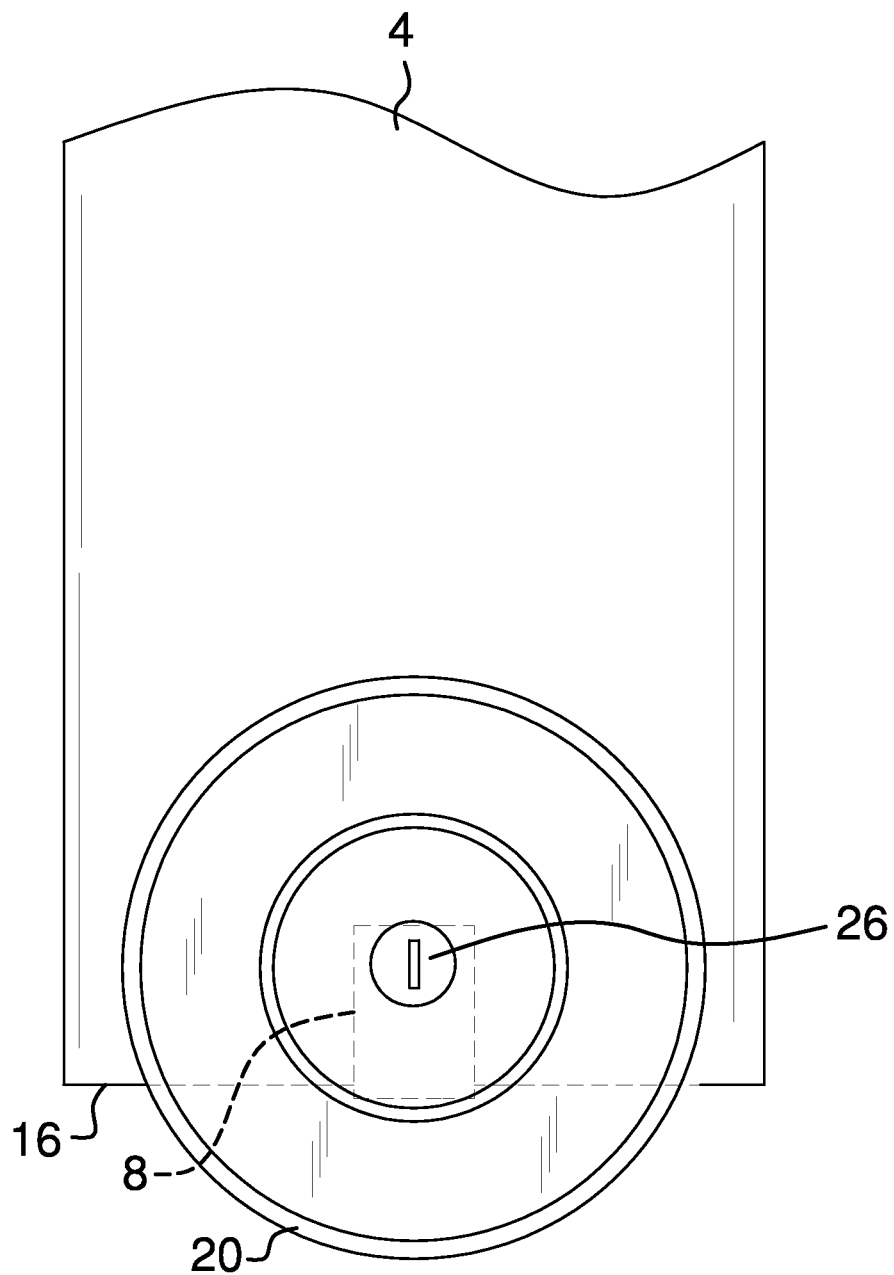
FIG. 5 is a side view of the leaf blower wheel attachment as it is shown in use.
Figure 6:
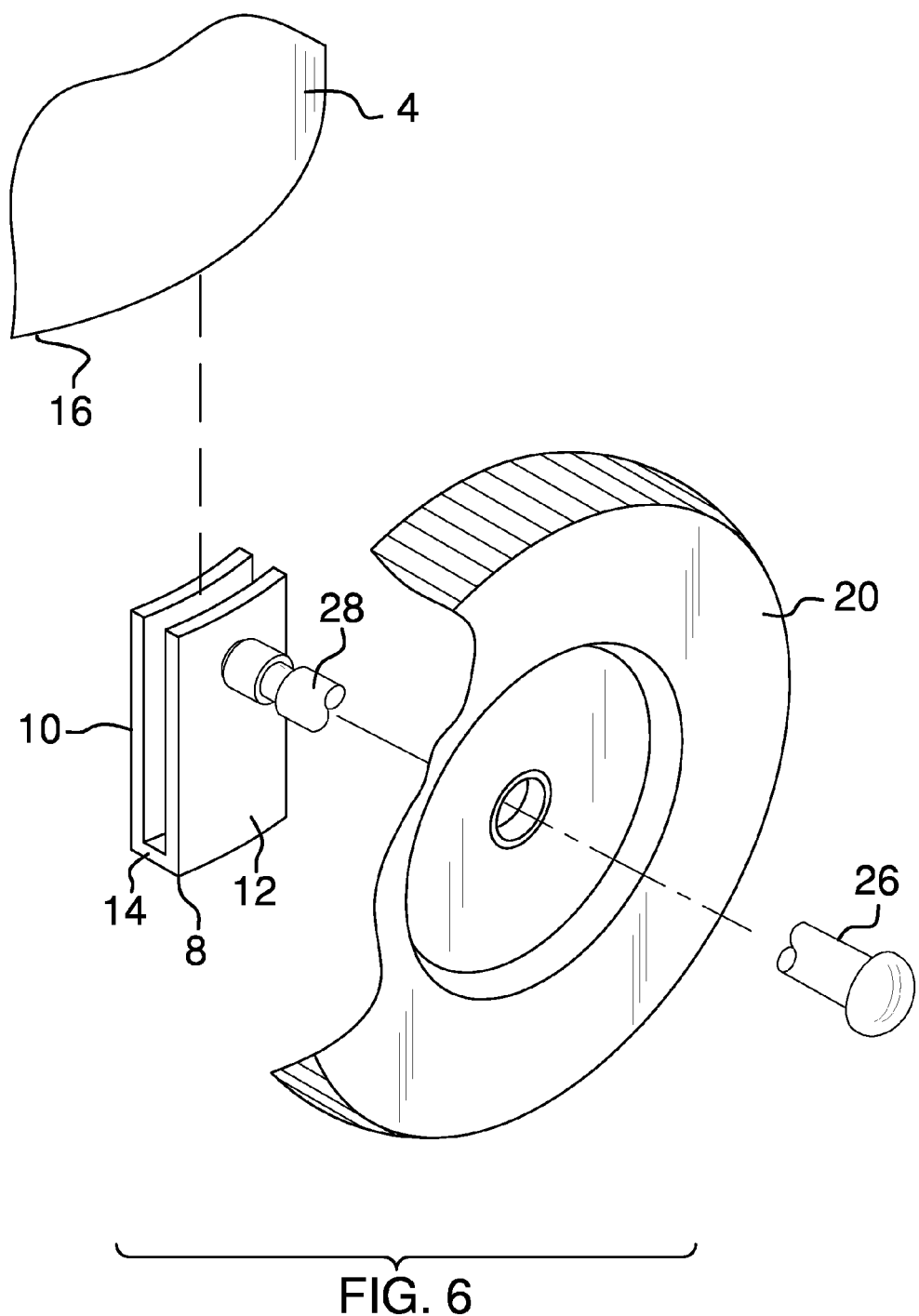
FIG. 6 shows a perspective close-up view of the wheel and clip assembly.

With reference now to the drawings, and in particular FIGS. 1 through 6 thereof, an example of the instant leaf blower wheel attachment employing the principles and concepts of the present leaf blower wheel attachment and generally designated by the reference number 2 will be described.

Referring to FIGS. 1 through 6, a preferred embodiment of the present leaf blower wheel attachment 2 is illustrated. The leaf blower wheel attachment 2 is preferred for use with a canister suction attachment 4 that would generally be utilized with a leaf blower, which is not highlighted due to the fact that many types of leaf blowers generally include a canister suction attachment 4 as a working component. Also, the leaf blower wheel attachment 2 can be properly disclosed and made enabling by merely highlighting its relationship with the canister suction attachment 4.

A pair of U-shaped attachment members 6 and 8 are associated with the leaf attachment 2. Each attachment member 6, 8 include both an inner wall 10 and an outer wall 12, and furthermore, include a base 14. Both the inner wall 10 and the outer wall 12 of each attachment member 6, 8 are connected to its associated base 14. The inner wall 10 and outer wall 12 are appropriately curved to allow each attachment member 6, 8 to be placed over the bottom end 16 of the canister suction attachment 4 in a snug fitting arrangement. Preferably, each of the attachment members 6, 8 are located one hundred eighty degrees opposite one another on the bottom end 16 of the canister suction attachment 4.

A pair of wheels 18 and 20 is associated with the present invention as well. Wheel 18 is connected to attachment member 6 by the use of a wheel axle 22 that overlaps a wheel axle connector 24. The wheel axle connector 24 is itself directly attached to the outer wall 12 of the attachment member 6. Wheel 20 is connected to attachment member 8 by the use of a wheel axle 26 that overlaps a wheel axle connector 28. The wheel axle connector 28 is itself directly attached to the outer wall 12 of the attachment member 8.

In use, the bottom end 16 of the canister suction attachment 4 will ride a few inches above a ground surface 30. The use of the wheels 18 and 20 will allow an the canister suction attachment 4 to be mobile, thereby eliminating the need of an individual in having to bear the extra weight of the canister suction attachment 4 when it is in use. The wheels, therefore, help to alleviate an individual's stress, fatigue, and pain typically suffered by a person using a leaf blower.

What is claimed is:

1. A leaf blower wheel attachment in combination with a canister suction attachment, the canister suction attachment including a bottom end, the leaf blower wheel attachment comprising:
   a pair of attachment members comprising a first attachment member and a second attachment member;
   a pair of wheels comprising a first wheel and a second wheel;
   wherein the bottom end of the canister suction attachment is placed within the first attachment member and the second attachment member;
   further wherein the first wheel is rotatably attached to the first attachment member;
   further wherein the second wheel is rotatably attached to the second attachment member;
   wherein each attachment member further comprises:
      a base;
      an inner wall attached to the base;
      an outer wall attached to the base;
      wherein the inner wall and the outer wall of each attachment member are curved to allow each attachment member to be placed over the bottom end of the canister suction attachment;
   wherein the leaf blower wheel attachment further comprises:

a pair of wheel axle connectors comprising a first wheel axle connector and a second wheel axle connector, wherein the first wheel axle connector is directly attached to the outer wall of the first attachment member, further wherein the second wheel axle connector is directly attached to the outer wall of the second attachment member; and a pair of wheel axles comprising a first wheel axle and a second wheel axle, wherein the first wheel axle rotatably connects the first wheel to the first wheel axle connector, further wherein the second wheel axle rotatably connects the second wheel to the second wheel axle connector.

2. A leaf blower wheel attachment in combination with a canister suction attachment, the canister suction attachment including a bottom end, the leaf blower wheel attachment comprising:

a pair of attachment members comprising a first attachment member and a second attachment member; wherein each attachment member further comprises:
a base;
an inner wall attached to the base;
an outer wall attached to the base;
wherein the inner wall and the outer wall of each attachment member are curved to allow each attachment member to be placed over the bottom end of the canister suction attachment;

a pair of wheels comprising a first wheel and a second wheel;

wherein the bottom end of the canister suction attachment is placed within the first attachment member and the second attachment member;

a pair of wheel axle connectors comprising a first wheel axle connector and a second wheel axle connector, wherein the first wheel axle connector is directly attached to the outer wall of the first attachment member, further wherein the second wheel axle connector is directly attached to the outer wall of the second attachment member; and a pair of wheel axles comprising a first wheel axle and a second wheel axle, wherein the first wheel axle rotatably connects the first wheel to the first wheel axle connector, further wherein the second wheel axle rotatably connects the second wheel to the second wheel axle connector.

* * * * *